(12) United States Patent
Mishra

(10) Patent No.: US 6,345,315 B1
(45) Date of Patent: Feb. 5, 2002

(54) METHOD FOR PLATFORM AND PROTOCOL INDEPENDENT COMMUNICATION BETWEEN CLIENT-SERVER PAIRS

(76) Inventor: Sudhindra N. Mishra, 1900 McCarthy Blvd. Ste. 106, Milpitas, CA (US) 95035

( * ) Notice: Subject to any disclaimer, the term of this patent is extended or adjusted under 35 U.S.C. 154(b) by 0 days.

(21) Appl. No.: 09/133,772

(22) Filed: Aug. 12, 1998

Related U.S. Application Data

(60) Provisional application No. 60/055,558, filed on Aug. 13, 1997.

(51) Int. Cl.[7] .................................................. G06F 9/00
(52) U.S. Cl. ........................................ 709/329; 709/246
(58) Field of Search ............................ 714/15; 709/220, 709/227, 203, 246, 329

(56) References Cited

U.S. PATENT DOCUMENTS

| | | | |
|---|---|---|---|
| 5,218,699 A | 6/1993 | Brandle et al. | 395/650 |
| 5,491,693 A | 2/1996 | Britton et al. | 370/85.13 |
| 5,491,800 A | 2/1996 | Goldsmith et al. | 395/200.12 |
| 5,509,123 A | 4/1996 | Dobbins et al. | 395/200.15 |
| 5,613,090 A | 3/1997 | Willems | 395/500 |
| 5,619,650 A * | 4/1997 | Bach et al. | 709/246 |
| 5,627,829 A | 5/1997 | Gleeson et al. | 370/230 |
| 5,636,371 A | 6/1997 | Yu | 395/500 |
| 5,832,219 A * | 11/1998 | Pettus | 709/203 |
| 5,951,694 A * | 9/1999 | Choquier et al. | 714/15 |
| 6,003,084 A * | 12/1999 | Green et al. | 709/227 |
| 6,070,187 A * | 5/2000 | Subramaniam et al. | 709/220 |

* cited by examiner

*Primary Examiner*—Zarni Maung
*Assistant Examiner*—Jungwon Chang
(74) *Attorney, Agent, or Firm*—Frank G. Morkunas

(57) ABSTRACT

A segue component for transferring data between a client and server such that the transfer is platform- and protocol-independent. The component is linked to applications in a computer system and connected to a transport medium for transporting data between applications. The component has a logical frame element for delivery to the applications and for collection of data representative of operations associated with the applications; a physical frame element for delivery between a requesting agent and a target agent, the physical frame having a header element and an argument list element; a mechanism for converting data collected at the requesting agent's logical frame into a literal form language-independent format and packaging that data in a byte-oriented format into the requesting agent's physical frame; a mechanism for transporting the data to a target agent; a mechanism for extracting the data from the requesting agent's physical frame into a target agent's physical frame; and a mechanism for parsing that data, for converting it into executable form, and for delivering it to the target agent's logical frame for action.

26 Claims, 9 Drawing Sheets

METHOD FOR PLATFORM AND PROTOCOL INDEPENDENT COMMUNICATION BETWEEN CLIENT-SERVER PAIRS

CROSS REFERENCES TO RELATED APPLICATIONS

This application claims priority of a prior provisional application, application Ser. No. 60/055,558, filed on Aug. 13, 1997, by the sole named inventor herein who was the sole named inventor for the previously filed provisional application

STATEMENT REGARDING FEDERALLY-SPONSORED RESEARCH OR DEVELOPMENT

Not applicable

BACKGROUND OF THE INVENTION

This present invention relates to an improvement in a communication system between computers and associated peripherals and appliances, and more particularly to platform- and protocol-independent communication.

In today's industry many users are faced with severe incompatibility problems, when they need to establish an information processing system. It is because the users are able to choose from a large set of available system components from many vendors for performing similar functions. For example, a computer user may need to have access to printer, scanner, telephone, FAX, camera, microphone, audio system, machine tools, alarm system, monitoring system, or other similar device, system, or appliance, besides the computer, depending upon the intended purpose.

All such entities that reside outside the conventional boundary of a computer system, but are attached in some way and can communicate with it, are generally called computer peripherals. Lately, many types of such peripherals are commonly attached to one or more computers, all interconnected by means of a network. A pair of such entities, either connected directly or by means of a network, which have a special relationship wherein one requests a service to be performed while the other performs the requested service, are commonly referred to as Client-Server pair. A server may be another computer or a computer peripheral, as long as it is capable of performing a known service, for example printing or database-access, etc. A client is typically a user application (such as a wordprocessor), either running locally or remotely, that needs the service.

In such a situation, the request for service arises out of an application and travels through several layers of client system software, through the client hardware, through the connecting medium, through the server hardware, possibly through several layers of server system software, finally to the server application software. Likewise, the server response flows back to the client in identical manner but in the opposite direction.

Typically, many clients request service from a given server. A general case of such interaction occurs on a network, where many clients may be distributed over several computers. These clients may be user applications created by many separate vendors, which may be executing on computers created by many other and different vendors. Yet all these clients and servers must communicate reliably and efficiently. Therefore, a standard is needed for facilitating such communication between different entities. A network protocol is such a standard. A layered model, such as the OSI (Open Systems Interconnection), is a stack of network protocol software that a client-server pair typically uses today to communicate with each other.

Even though the above-described approach conceptually solves the compatibility problem between clients and servers on a network, incompatibility may result due to many factors in reality. To begin with, there are several protocols at the Data-Link layer itself each with its own unique properties and behavior (such as Ethernet/IEEE-802.3, Token-Ring/IEEE-803.4, AppleTalk, FDDI (Fiber Digital Data Interconnect), ATM (Asynchronous Transfer Mode), etc.). There are also several protocols at the Network and Transport layers as well, e.g. TCP/IP (Transmission Control Protocol/Internet Protocol), IPX/SPX (Novell standard), NETBEUI (Microsoft standard), and AppleTalk, to mention a few. Likewise, there are several protocols for communicating with directly attached servers too; e.g., RS-232, IEEE-1284, IEEE-1394, Apple Desktop Bus, etc.

It should be noted that although all these protocols facilitate communication successfully and reliably, all of these, with one exception, namely RPC (Remote Procedure Call), are designed to transport data. RPC is a layer designed to operate on top of TCP/IP for remote execution of programs and to interpret data in a specific manner regarding the execution of a program or application. The recipient is obligated to execute a pre-existing code contained thereat. RPC is directed at solving a particular problem with a particular motivation, namely distributed processing. It has been very successfully deployed in the implementation of NFS (Network File System) in UNIX systems. Lately, newer distributed program system architectures such as CORBA (Common Object Request Broker Architecture), DCOM/ActiveX (Distributed Common Object Model), SOM (Simple Object Model), NEST (Novel Embedded System Technology), and JAVA (developed by Sun Microsystem), and the like, have come into existence. However, all these are incompatible with each other, which results in extremely difficult inter-operation creating severe difficulties for the user.

This invention seeks to solve the problem of software incompatibility in the special case of client-server communication, especially with regard to that needed between an application running on a host computer and its computer peripherals intended to function as directly attached or network-connected servers. The existing solutions, as described above, are either too complex or too expensive for this purpose, since those are designed to solve a more general set of problems.

The client-server communication under consideration here is characterized by a simple exchange of data that can occur in a platform-independent manner. None of the above-described systems can accomplish this form of exchange as can the present invention. Nor can the inventions described in U.S. Pat No. 5,491,693 issued to Britton on Feb. 13, 1996 (addressing the problem of incompatibility between various communication protocols in a heterogeneous network environment and attempts to solve the problem through translation of communication data from one protocol to another using a smart Gateway); U.S. Pat. No. 5,613,090 issued to Willems on Mar. 18, 1997 (addressing the problem of a special case of disparate windowing environments, namely that existing between X-Window Systems available on various UNIX platforms, by introducing a layer of software in the communication path to translate request and responses in both directions); U.S. Pat. No. 5,627,829 issued to Gleeson on May 6, 1997 (addressing the problem of reducing network traffic by eliminating unnecessary protocol data which may arise out of transition between LANs and WANs); and U.S. Pat. No. 5,636,371 issued to Yu on Jun. 3, 1997 (addressing the problem of concurrent execution of multiple instances of well known port applications and solves it through port mapping on a single protocol stack).

In order to create a protocol-independent communication and hardware-independent software at both ends, the following principles must be upheld:

a. The exchange of information between the client and server must be in a format not tied to any communication protocol and be such that data contained in this exchange can be interpreted unambiguously in a vendor-neutral, hardware-neutral, and protocol-neutral manner.

b. The client should be required to know only the published capabilities (or parameters) of the server, along with possibly the number of parameters, their datatypes (which must be most primitive and language-neutral), and their sizes. The knowledge of how a server may render those capabilities must be completely hidden from the client. Likewise, any client activity triggered by events reported by the server must be completely hidden from the server.

c. There is no need for either agent (client or server whether acting as initiator/requestor or responder/target) to indicate urgency or priority of requested action to the other. The agent performing the service has full knowledge of urgency or priority of requested action and it must keep that knowledge private.

If the above principles have to be adhered to, it is necessary to add an interface layer as a communication session manager (referred to herein as session manager or segue component) between the existing communication protocol (or transport mechanism) in use and the application software. The purpose of this segue component would be to create the abstractions needed for the desired independence and to be the exchange medium or facilitator of pre-formed containers or frames between the application (client's or server's) and the transport mechanism between client and server.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a unique segue component linked to one or more applications in a computer system and connected to a transport medium for transporting data between one or more clients of the computer system interconnected to one or more servers of the computer system wherein the component has a logical frame element for delivery to the applications and for collection of data representative of the operations associated with the applications; a physical frame element for delivery between a requesting agent and a target agent wherein the physical frame has a header element and an argument list element; means for converting data collected at the requesting agent's logical frame into a literal form language-independent format and packaging that data in a byte-oriented format into the requesting agent's physical frame; means for transporting the data to a target agent; means for extracting the data from the requesting agent's physical frame into a target agent's physical frame; and means for parsing that data, for converting it into executable form, and for delivering it to the target agent's logical frame for action.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which.

DETAILED DESCRIPTION OF THE INVENTION

Figure 1:
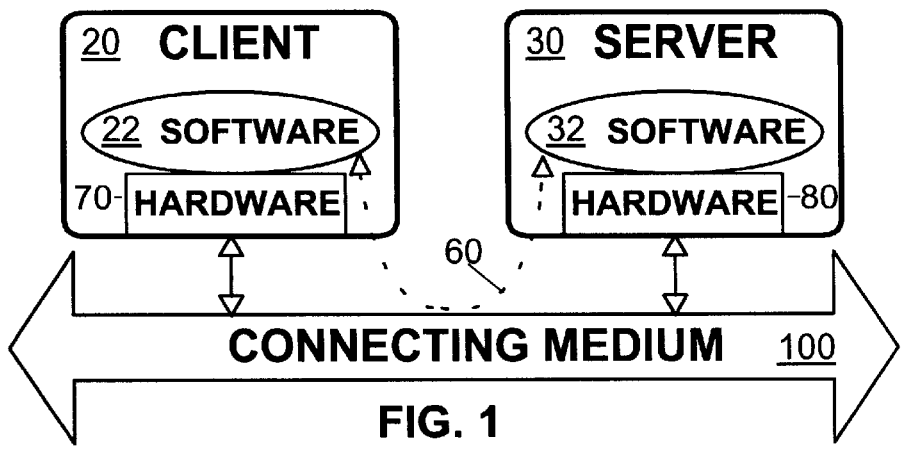
FIG. 1 is a diagram illustrating a typical client-server interactions

FIG. 1 illustrates a typical client 20—application 22 (such as a wordprocessor), either running locally or remotely, which requires a certain service (such as printing or faxing or the like). The hardware 70 at the client end could consist of computer, monitor, and keyboard, or similar components. The communication path or medium 100 here could be merely a cable connecting the server's hardware 80 (printer for example) and the software (or application) 32 controlling that peripheral.

Figure 2:
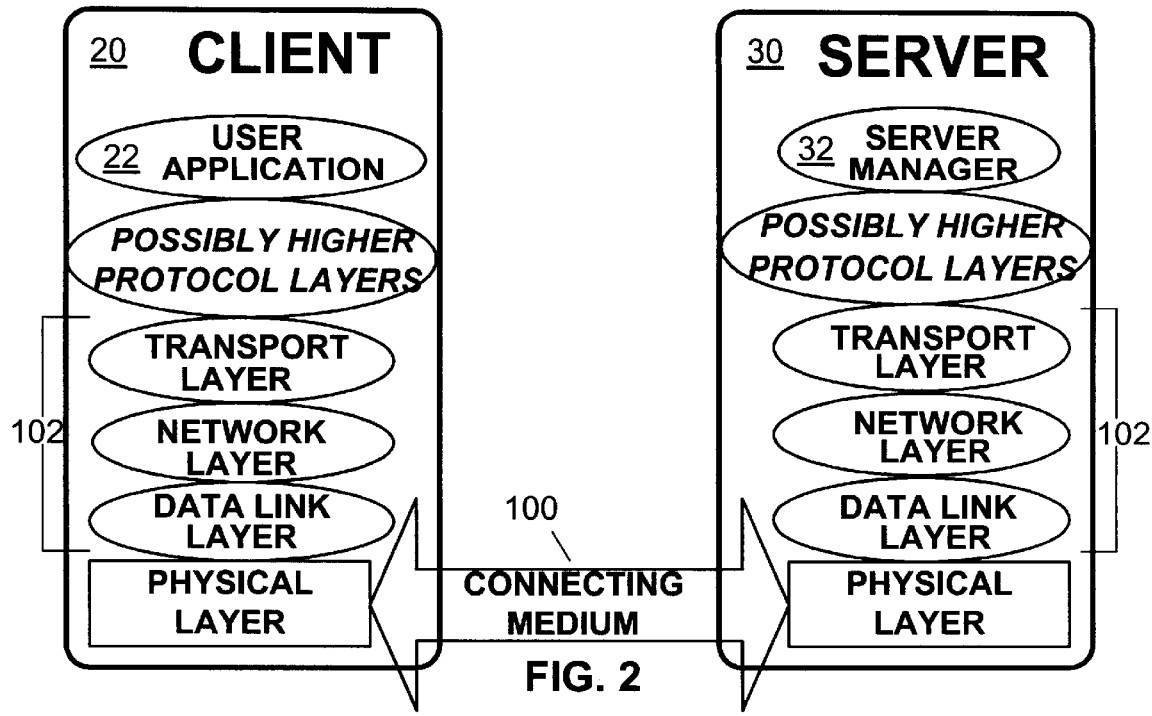
FIG. 2 is a diagram illustrating a layered model network protocol stack configuration between client and server.
Figure 5:
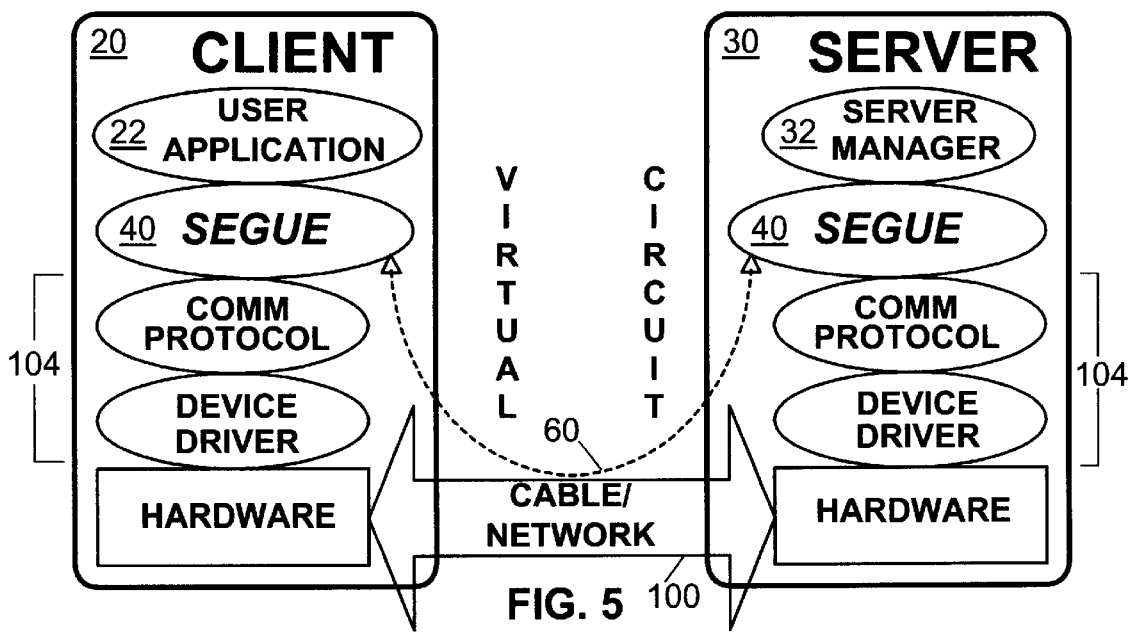
FIGS. 5 through 9 illustrate the structural relationship of the present invention in various communication protocols.
Figure 6:
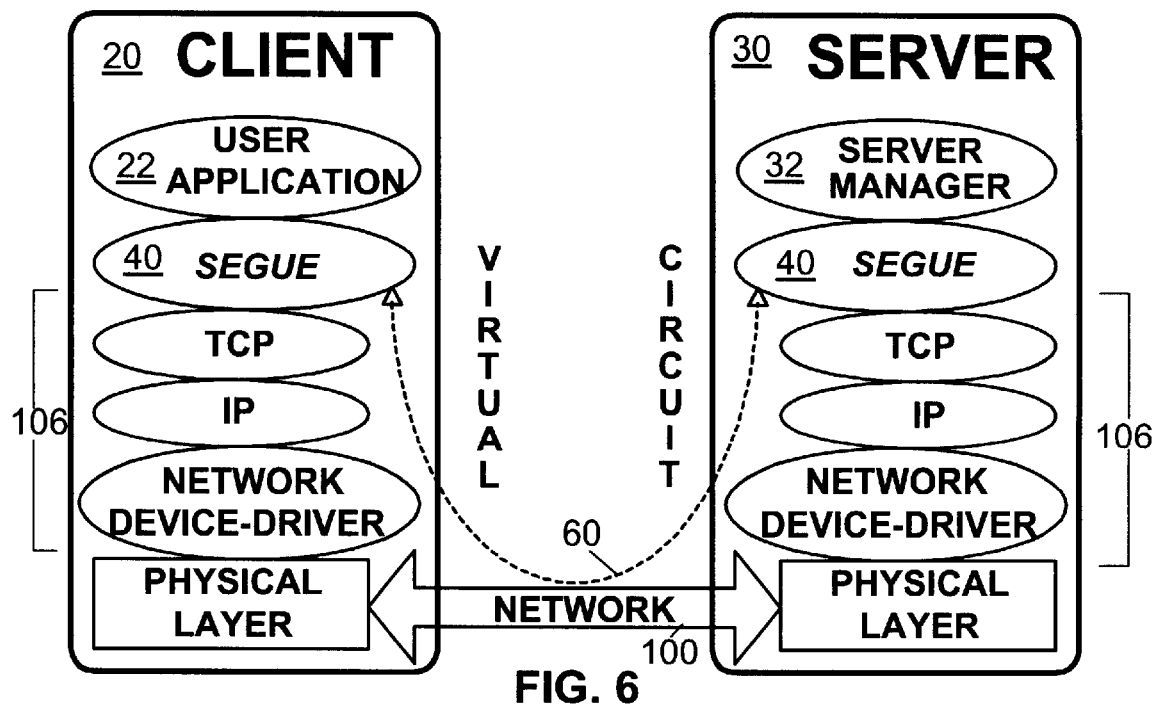
Figure 7:
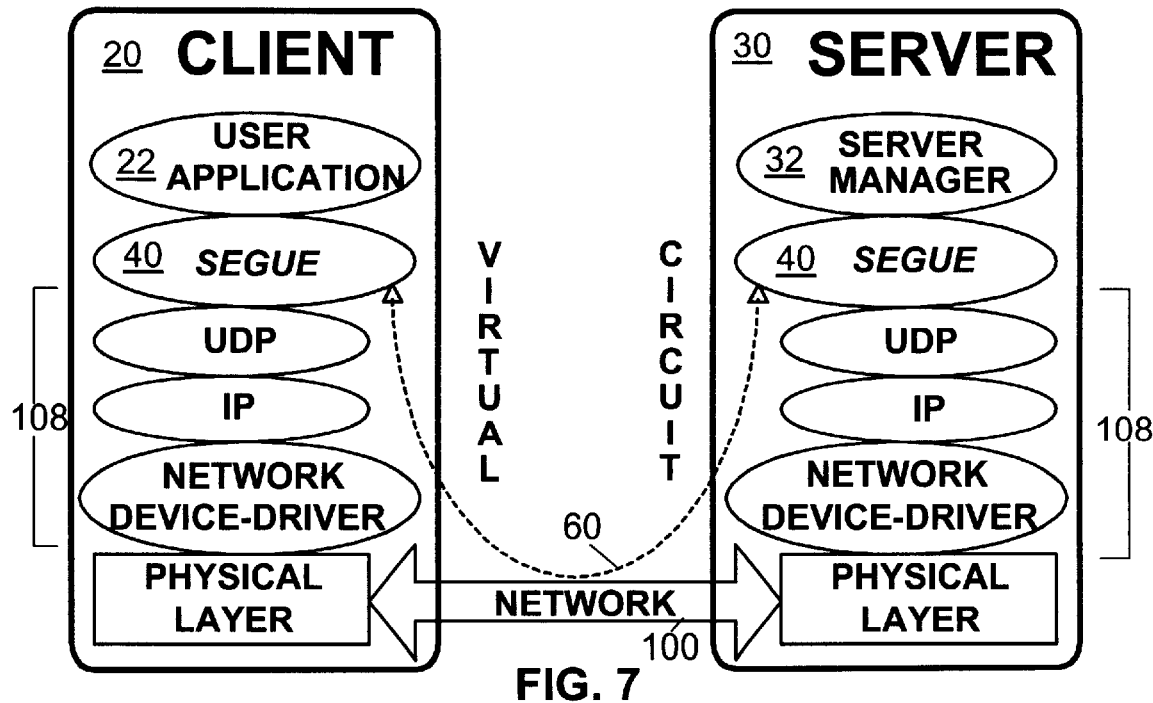
Figure 8:
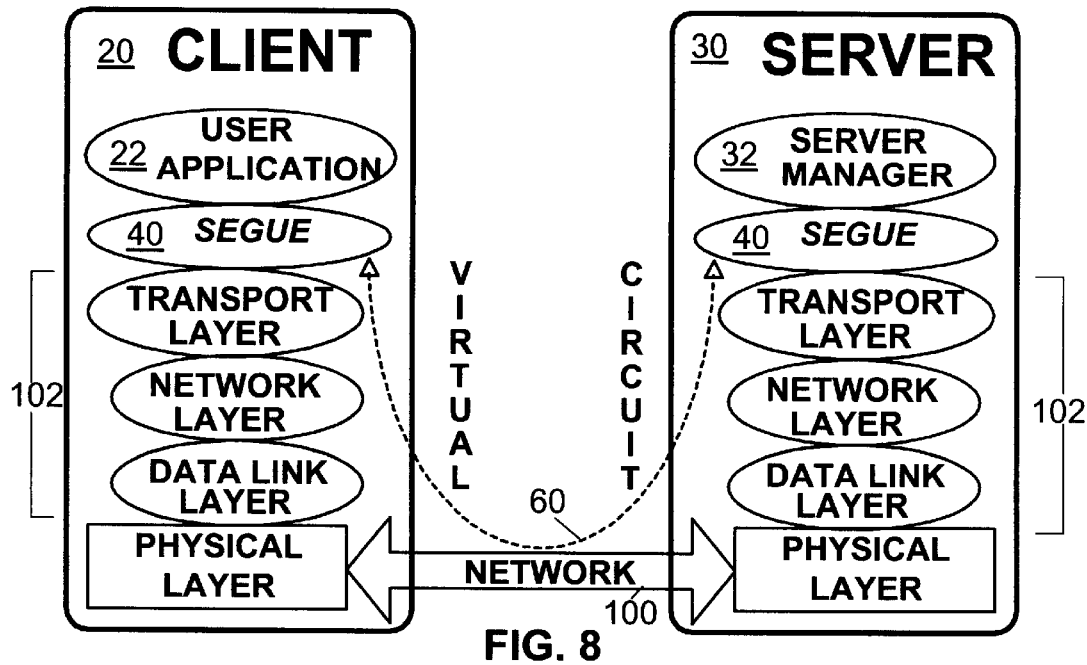

FIG. 2 represents a layered model configuration of network protocol stack 102, such as OSI, between client 20 (through its application 22 down through the layers) to the server 30 (up through its layers to its application 32). This is a typical client-server pair commonly used today to communicate with each other. Even though this approach (OSI) conceptually solves the compatibility problem between clients and servers on a network, incompatibility may result due to many factors in reality. For example, there are several protocols just at the Data-Link layer itself each with it own unique properties and behavior.

Figure 3:
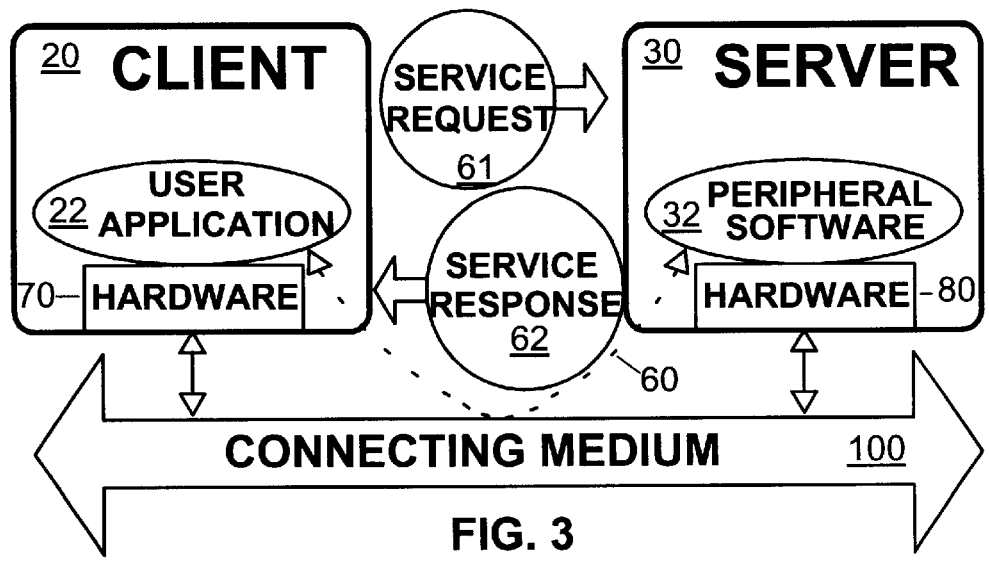
FIGS. 3 and 4 illustrate the basic behavioral relationship embodied in the present invention between client and server.

FIG. 3 illustrates the behavioral relationship associated with the present invention between the client-server in very simple terms. In this relationship, a client 20 sends service request 61 (an action) to the server 30; the server 30 performs the requested service and then returns the service response 62 (the reaction). The service response 62 could simply be an acknowledgment of the fact that the service was performed, it may be the results from the performed service (i.e., printing on a request for a print job), it may be a request for more information, or it may be no action (reaction) at all depending on the circumstances and result of the service request.

What the present invention contemplates is the creation of a virtual circuit 60 through the connecting or transport medium 100 between client 20 and server 30. Any conventional transport medium will suffice and support the present invention.

Figure 4:
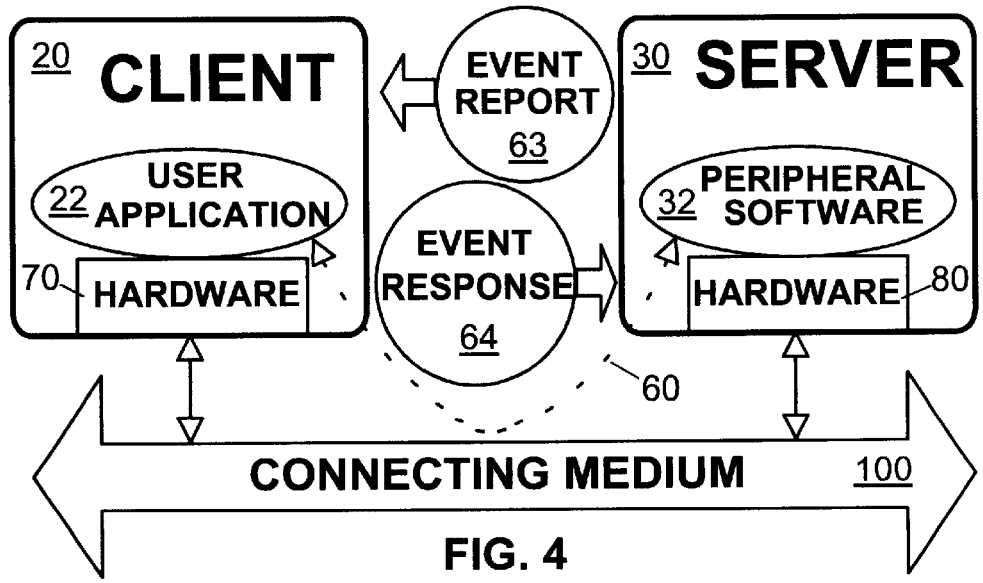

As illustrated in FIG. 4, the server 30 can also initiate a dialog; be pro-active and provide feedback to the client 20 as to the status of a request, problems associated with a request, and the like. In most applications, the server 30 would take such an initiative only when an event occurs within the server's environment and the server 30 feels obligated to report to the client by initiating an event report 63 (action). The client then may send an event response 64 (reaction) to the server. By way of example only, an event report 63 to a service request 61 for printing might be that paper is out, or that the printer is out of order and not responding, in which event the event response 64 might be to cancel the job or seek out a different printer. Such a feedback mechanism is especially important in connection-less configurations.

FIGS. 5 through 8 illustrate the structuring of the segue component 40 in the client-server communication path. In the various forms of communication path illustrated here 102, 104, 106, 108 the segue component 40 is linked, in any conventional manner, to the respective applications 22, 32 and the communications protocol and hardware 102 (OSI), 104, 106 (TCP/IP), 108 (UDP/IP [User Datagram Protocol/Internet Protocol]) connected thereat by a suitable connecting medium 100. As indicated, any conventional transport medium will suffice and support this invention. What is shown here is that the segue component 40 is capable of utilizing any form of underlying communication protocol that the local system administration decides to use as a matter of organizational policy. By so structuring the segue component 40, a virtual circuit is created.

From these examples, the segue component 40 may be thought of as the Session Layer in most cases, as well as the Transport Layer in some cases. The choice of communication protocol, at any installation, is facilitated through the segue component 40 in the form of dynamic link libraries and a configuration file. The segue component 40 thus creates this virtual circuit 60 for a point-to-point communication between the client 20 and the server 30 in the form of exchanging data by use of pre-formed identical frames into which data, in byte-oriented form, is placed; transferred; extracted; parsed; and reacted to. This virtual circuit 60 is a programmable logical path through which the data propagates. Such a logical path is established through selection and interaction of hardware and software resources in the participating systems.

Using the system envisioned by the present invention with its segue component 40 as further described in detail herein, the client 20 and server 30 have the ability to create any number of such virtual circuits 60, independent of one another, as required by the application (user's or server's). How a client-server pair may prioritize the use of one virtual circuit 60 over the others is entirely up to the application designers.

Figure 9:
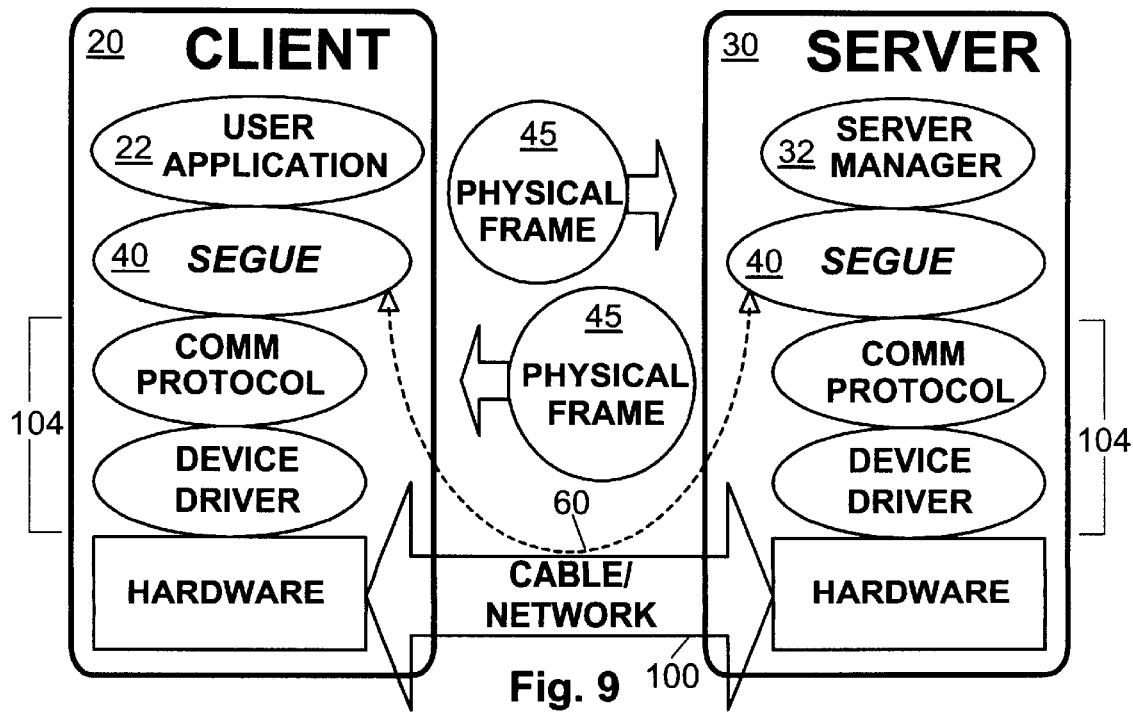
Figure 10:
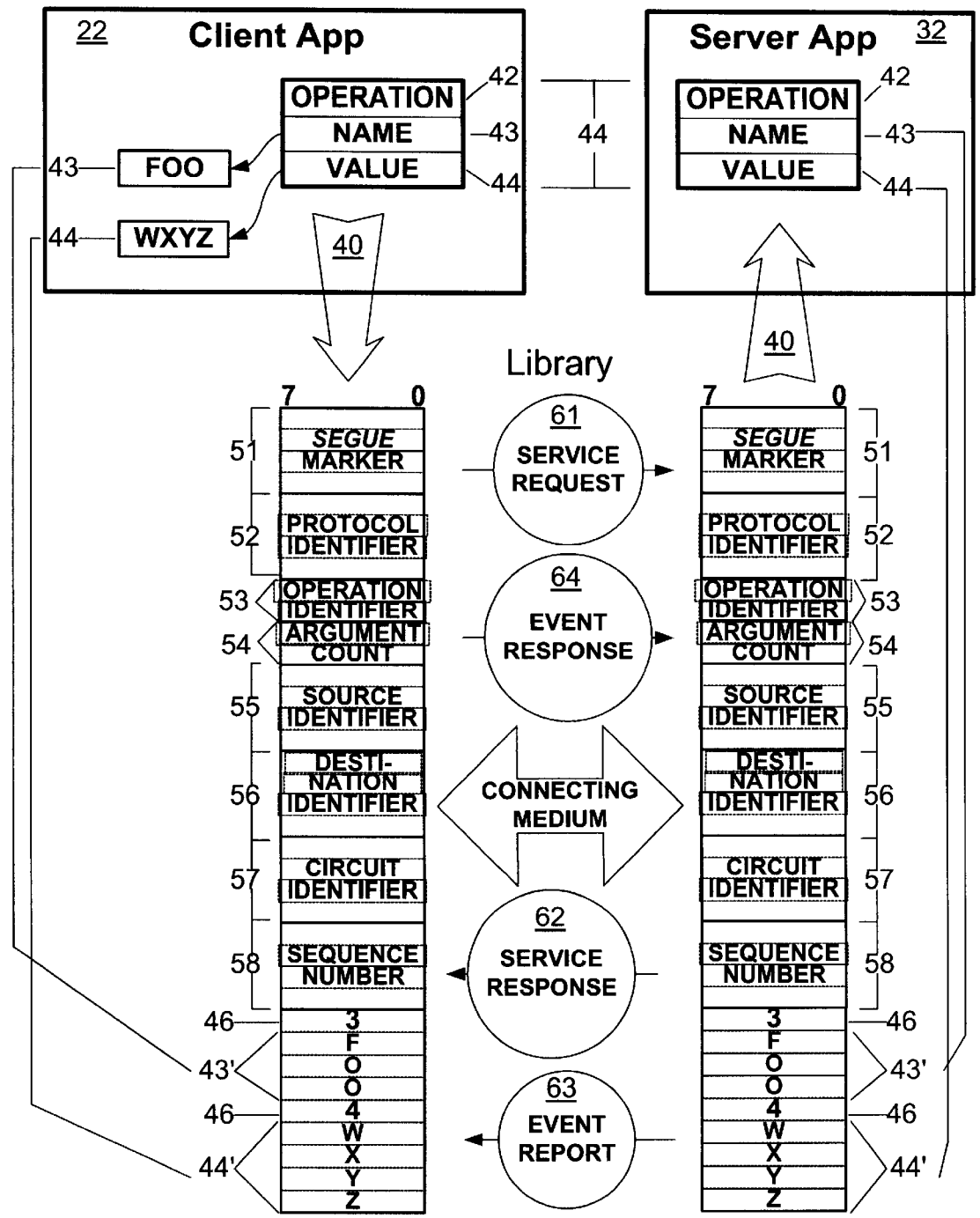
FIG. 10 illustrates the structure of the logical frame and the physical frame of the present invention.

The communication between the client 20 and the server 30 through the segue component 40 essentially occurs through the exchange of frames 41, 45 or containers as illustrated in FIGS. 9 and 10. This exchange occurs at two levels: (1) between the segue component 40 and the respective application 22, 32; and (2) between the segue component 40 of the client 20 and the segue component 40 of the server 30. Frames are allocated by the segue component 40 as and when needed. The frame presented by a segue component 40 to an application 22, 32 is the logical frame 41, the frame presented to/from the segue component 40 of the client 20 and the segue component 40 of the server 30 is the physical frame 45. The purpose of the respective frame is to abstract and encapsulate transferred data from one application into objects which are transported to another application such that it can be readily used.

Reference is made to FIG. 10. In this figure, a user 20 akes a request for an operation 42. The segue component 40 interprets the request and based on the interpretation, obtains and delivers the appropriate logical frame 41 to the application 22 for user interaction. The structure of the logical frame 41 is the view of the frame from the application side of the segue component 40. The logical frame generally consists of simply an Operation-Handle (an identifying code) 42 and a list of capabilities (or parameters) 43, 44 associated with that code 42 (operation). The parameters are comprised of one or more name 43 and value 44 pairs, depending on the capabilities of the server 30 involved. These parameters are available to any segue component 40.

The logical frame 41 reveals a name field 43 and a value field 44 associated with the requested operation 42. In this example, the user 20 requested an operation 42 bearing the name 'FOO' 43 which has a value 44 of 'WXYZ'. This data is collected by the segue component 40 and, if no changes or further interaction follows, the segue component 40 converts the data from Unicode into byte-oriented data and packages it into the appropriate fields of the physical frame 45. The applications 22, 32 always receive from and deliver to the segue component 40 a preformed logical frame 41. Likewise, the segue component 40 always delivers a preformed logical frame 41 to the application 22, 32. Data is exchanged between the requesting agent and the target agent by use of the logical frame 41 and the physical frame 45.

The data-structure associated with the implementation of the logical frame at this level is dependent on the programming language of the application. The data-structure associated with implementation of the physical frame is independent of programming language of the application and, because data is converted into Unicode, if necessary, and represented in literal form at the physical frame 45 for transport, it is protocol- and platform-independent.

The size of a physical frame 45, although variable, is always known by each segue component 40 such that it can easily be parsed from an inbound data-stream on the target end. Likewise, the frame data is easily serialized for an outbound data-stream on the requesting end. The segue component 40 extracts/serializes the frame data and delivers it to the underlying communication protocol. The applications 22, 32 always deliver a preformed logical frame 41 to the segue component 40 for conversion into a physical frame 45. Likewise, the segue component 40 always delivers a preformed logical frame 41 to the application 22, 32 after the data is extracted and parsed from the incoming physical frame 45 and has been converted into a logical frame 41 usable by the respective application. The data in the physical frame 45 is byte-oriented and literal hence, independent of the associated platform.

The physical frame 45 is structured on the transportation side of the segue component 40. It consists of a plurality of fields comprised of byte records which embody all the information, in a literal form and byte-oriented format, contained in the corresponding logical frame 41. As such, it is platform-independent. It is the structure and appearance of the physical frame 45 which enables a platform-independent transport of the intended communication data.

The frames (logical 41 and physical 45) are identical in format in both directions; from/to application 22, 32 from/to respective segue component 40, from/to respective segue component 40 at the requesting and target ends. The communication thus established also is asynchronous in nature; i.e., not every frame is acknowledged or gets responded to explicitly (as indicated earlier, however, a "no reaction" is also considered a response). It is entirely up to the application designers as to what is contained in the frames. If reliable communication is desired, then a reliable underlying transport mechanism may be chosen. However, the physical frames contain a mechanism for retransmission, should an application 22, 32 or respective segue component 40 have the need to do so.

Figure 11:
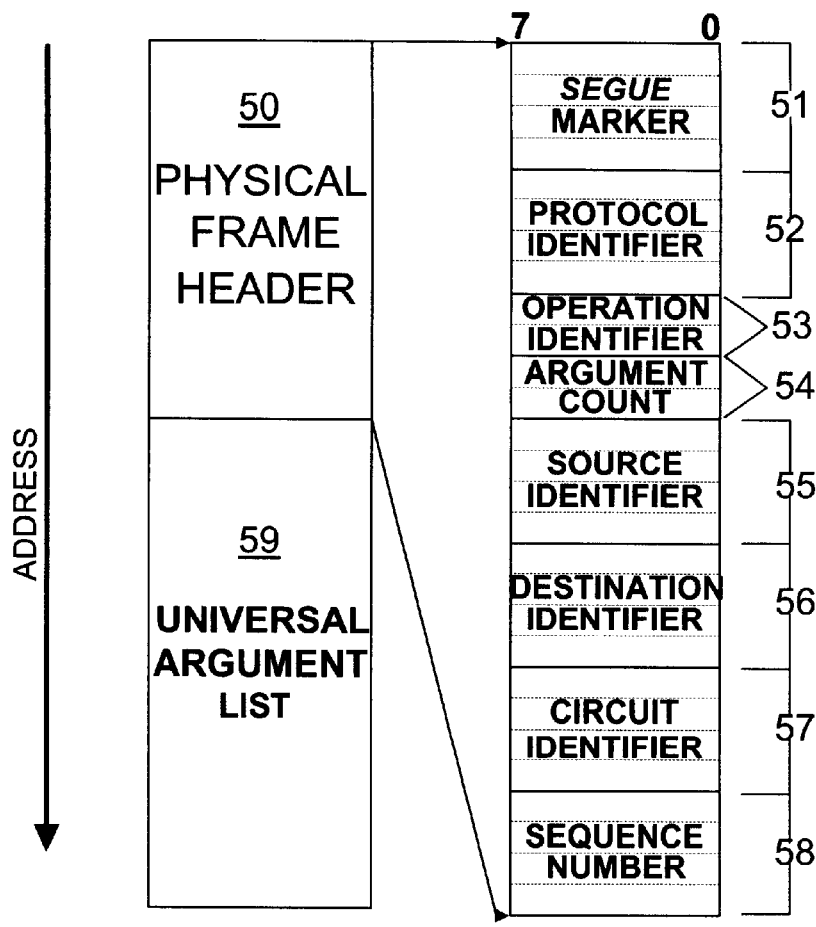
FIG. 11 is a detailed illustration of the physical frame of the present invention.

This structure and appearance of a physical frame 41 generally consists of the following two parts: (1) a frame header element 50; and (2) a universal argument list element 59. The frame header element 50 is always fixed in size. The universal argument list element 59 is variable in size. FIGS. 10 and 11 detail the structure and appearance of the physical frame 45.

The frame header element 50 has a plurality of fields. These include a marker 51, a protocol identifier 52, an operation identifier 53, an argument count 54, a source identifier 55, a destination identifier 56, a circuit identifier 57, and a sequence number 58.

The marker 51, shown here for illustration purposes only as a 4-byte field, is a special bit pattern <0×FEEDFACE>, which identifies the beginning of a physical frame 45. The purpose of this field is to significantly increase the probability that the agents (requesting and target) are correctly synchronized at the respective frame boundary. The protocol identifier 52, shown here for illustration purposes only as a 4-byte field, identifies the communication protocol in use for the connection between two segue components 40 (client and server). Since the system described by the present invention can use any protocol underneath to transport data, the two end-points of a connection must know (each segue component 40 that is), which protocol is in use for that connection.

The operation identifier 53, shown here for illustration purposes only as a 2-byte field, represents one or more operations of a target agent (these operations have been prepublished and are contained within the system). The value contained in this field is only significant to the target agent. The requesting agent only regards it as a handle (code) associated with its pre-published operation.

The argument count 54, shown here for illustration purposes only as a 2-byte field, specifies the number of parameters associated with current request. A value of zero means none. The maximum allowed number of parameters are 255.

The source identifier 55, shown here for illustration purposes only as a 4-byte field, specifies the identity of the requesting (or initiating) agent. This is done in the dotted notation form (as commonly used for IP addresses) generally consisting of 4 numbers each ranging from 0–225 with each of the 4 numbers being separated by dots. If the requesting agent is assigned an IP address, that IP address is used. If that agent is not assigned an IP address, the segue component 40 creates an appropriate source identifier 55 for the ensuing transactions.

The destination identifier 56, shown here for illustration purposes only as a 4-byte field, specifies the identity of the target (or reacting) agent. This also is done in the dotted notation form (as described above). If the target agent is assigned an IP address, that IP address is used. If that agent is not assigned an IP address, the segue component 40 creates an appropriate destination identifier 56 for the ensuing transactions.

The circuit identifier 57, shown here for illustration purposes only as a 4-byte field, is a 32-bit integer assigned by the server 30, which is unique for a given server 30. By combining the circuit identifier 57 with the server's identity (destination identity 56), a network-wide unique circuit identity in effect exists.

The sequence number 58, shown here for illustration purposes only as a 4-byte field, is a 32-bit integer assigned by the initiating/requesting agent. It represents the identity of the respective physical frame 45 from which data is being transferred. If the underlying protocol is unreliable, then this number may be used for requesting retransmission of the physical frame 45. This feedback mechanism is particularly desirable for connection-less transmissions.

The universal argument list field/element 59 of the physical frame 45 may specify up to 255 arguments to a request. The arguments are always specified as name-value pairs 43, 44; that is, a name part 43 and a value part 44 which come from the logical frame 41 as converted to Unicode and packaged, in literal form, into the physical frame 45 in the universal argument list element 59. If the application data is Unicode, conversion is not necessary but proper packaging is. For example, the byte ordering of the application code may be different than the byte ordering necessary for proper packaging of data into the universal argument list element 59. In the example shown in FIG. 12, that format is of a high/low ordering. The ordering could be low/high provided the same ordering is followed by all segue components 40.

Figure 12:
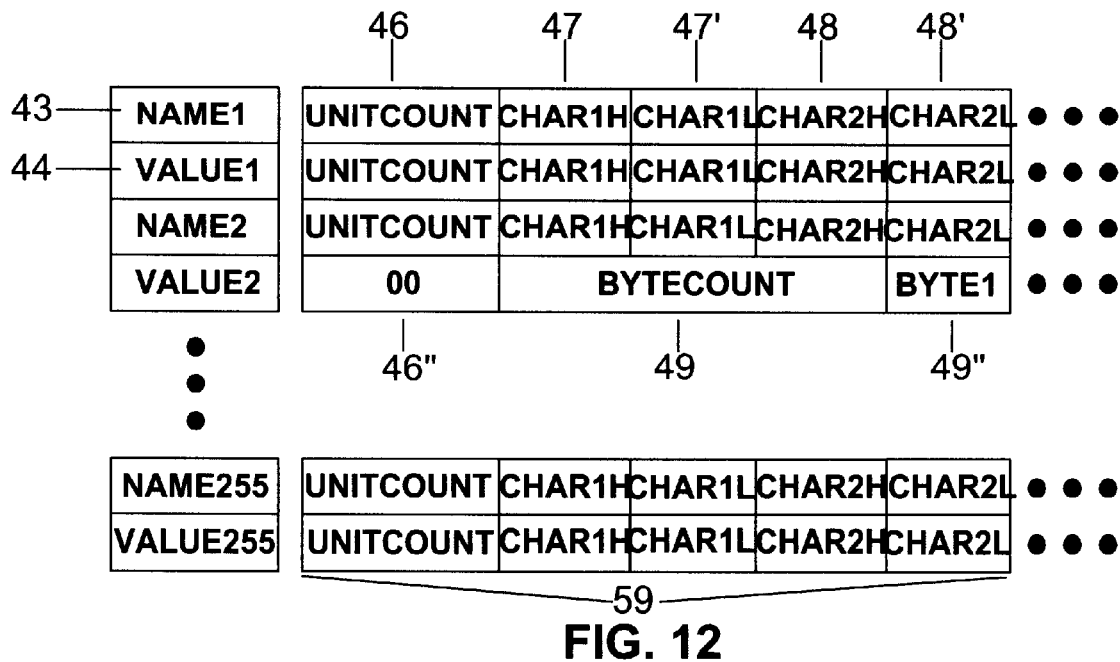
FIG. 12 is a detailed illustration of the physical structure of the universal argument list.

The name 43 and value parts 44 of an argument so packaged in the universal argument list element 59 are byte-oriented. There are only two basic data-types that can be used for specifying an argument. These are: (1) character string; and (2) byte string. The character strings consist of contiguous 16-bit Unicode characters, spanning two adjacent bytes, in the proper order. As shown in FIG. 12, Char1H 47 is the upper case, or high character, and Char1L 47' is the lower case, or low character. Character strings can be maximum 255 16-bit characters in length. Byte strings are contiguous bytes up to 16 Million bytes (24-bit size) in length.

FIG. 12 illustrates the structure of data in a universal argument list element 59. In this figure, the name-value pairs 43, 44 from the logical frame 41 are packaged by the segue component 40 into the universal argument list element 59. In this figure, the first named parameter 'Name1' 43 has a known length expressed in unit count 46; where unit count represents the number of Unicode characters if the parameter part happens to be a character string and represents the number of bytes if the parameter part is a byte string. The unit count is packaged into field 46 for Name1. This alerts the segue component 40 that it will retrieve that quantity unit-count of data for that name. In Unicode form, the literal representation of the first character has an upper case (Char1H) form 47 and a lower case (Char1L) form 47'; the second character has an upper case (Char2H) form 48 and a lower case (Char2L) form 48'; and so on. A value part 44 of a name-value parameter follows the same process with unit count 46 associated with the representation of the value, followed by that value, in Unicode, for each character.

Using the previous illustration in FIG. 10 of requesting an operation 42 named 'FOO' 43 bearing a value 'WXYZ' 44, the segue component 40 determines the unit count for the name 'FOO' 43 to be 3, and the unit count for the value 'WXYZ' 44 to be 4. The client 20 segue component 40 packages '3' 46, the unit count for 'FOO' 43, in the 1st section of the universal argument list element followed by 'F', 'O', and 'O' 43' in the next three sections. The sessions manager 40 next packages '4' 46', the unit-count for 'W,X, Y,Z' 44 in the next available (5th) section followed by 'W', 'X', 'Y', and 'Z' 44' in the 6th through 9th sections. The process continues until all the arguments from the logical frame 41 have been converted and packaged into the physical frame 45 universal argument list element 59.

The parameter name 43 of the name-value pair must always be a character string. The parameter value 44 of the name-value pair can be a character string or a byte string, the latter being very useful for transporting arbitrary data. A useful function of the current invention is to transport such data as a file transparently from the applications. The application need only specify the name of such a file as the value of a parameter named "File". After the data is transported, a native file by the same name results at the receiving side.

In operation, the segue component 40 interprets a request from the requesting application, provides a logical frame 41, collects data from the application, converts the data from its logical appearance into a physical frame 45 and the physical appearance thereof described above, serializes and transports the physical frame 45 to the target segue component 40. On the receiving/target end, the segue component 40 thereat reverses the process; data is extracted into its physical frame 45 from the transport mechanism, it is then parsed and converted into a logical frame 41 suited for the recipient/target application 22, 32 to react thereto. FIG. 10 illustrates this process during the course of a transaction.

The successful transmission of a frame (logical 41 between segue component 40 and application 22, 32; and physical 45 between client 20 segue component 40 and server 30 segue component 40) constitutes a transaction. Generally several transactions take place for a typical session. Dialog between the client 20 and the server 30 is essentially an arbitrary sequence of such transactions. As such, each frame (logical 41 and physical 45) is complete and independent with regard to the intended meaning of the transaction. It is entirely up to the application designer to decide which attributes are necessary to be packed into a single frame so that the target agent can react appropriately and, as necessary, accomplish the initiating agent's intended purpose. It should be noted that nothing in the transaction specifies an obligation by the target agent to respond with another transaction. It is the application logic that determines that a particular transaction needs a response.

Figure 13:
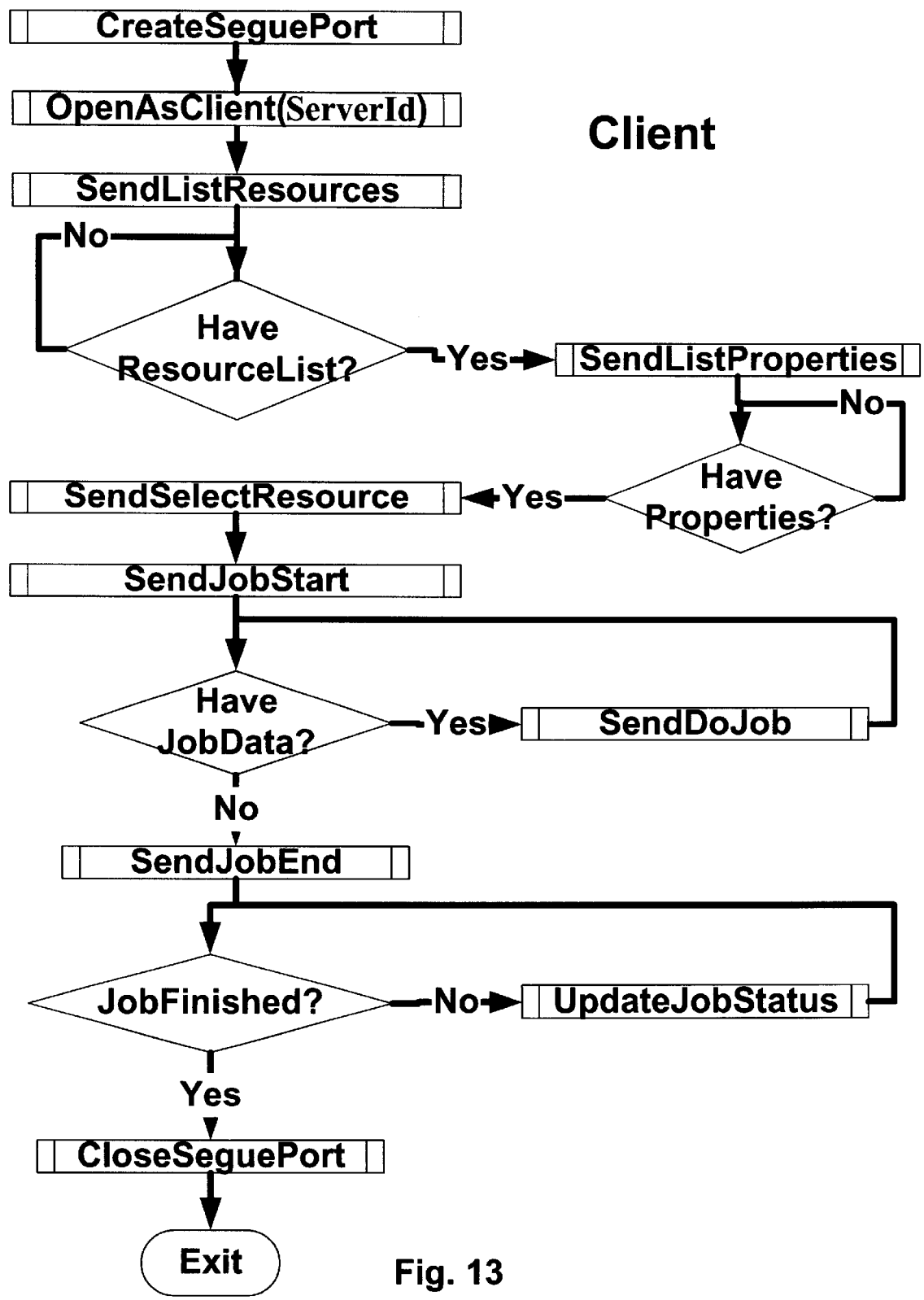
FIGS. 13 and 14 are flow charts representative of a typical client-server set of transactions applicable to the present invention.
Figure 14:
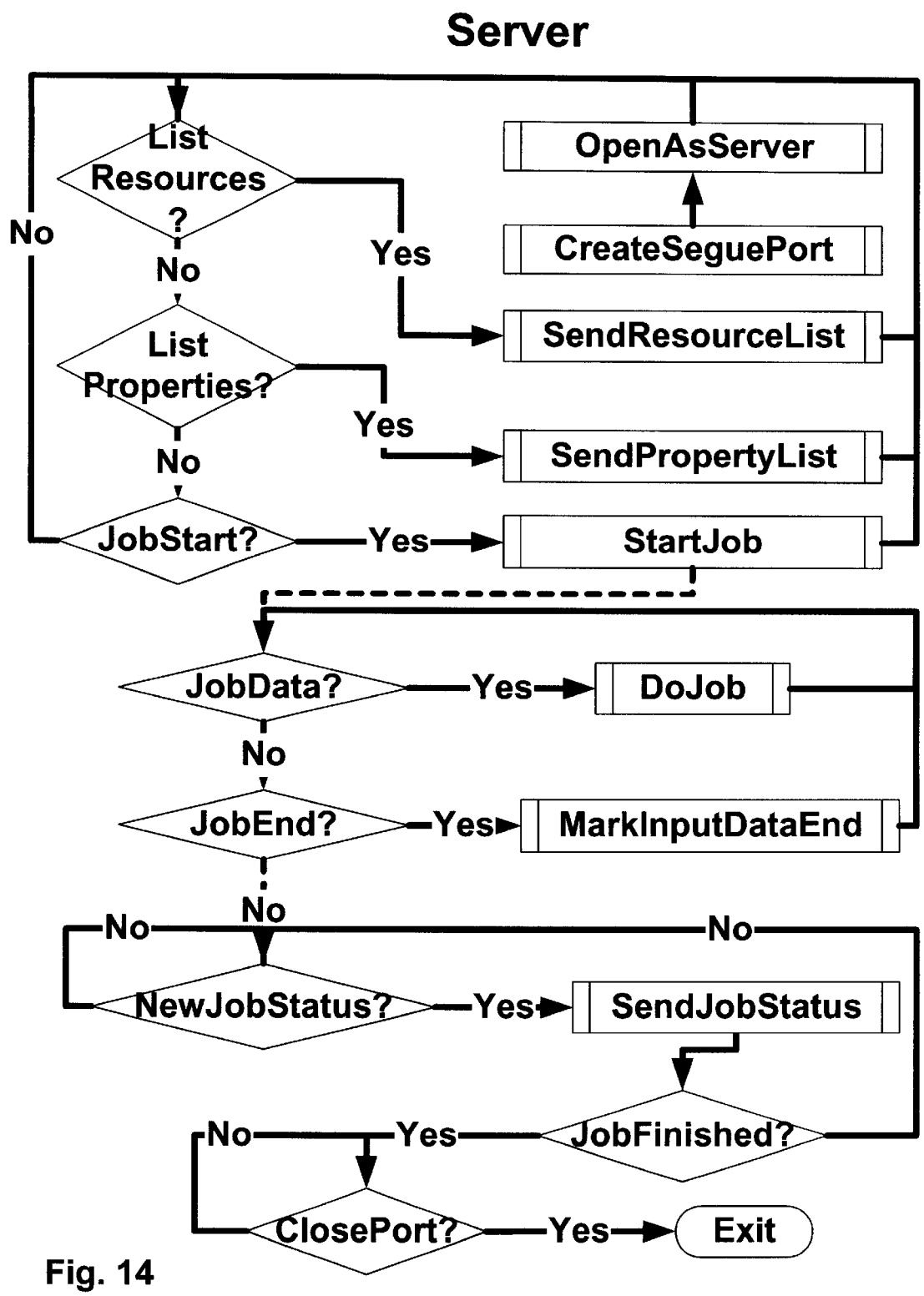
Figure 15:
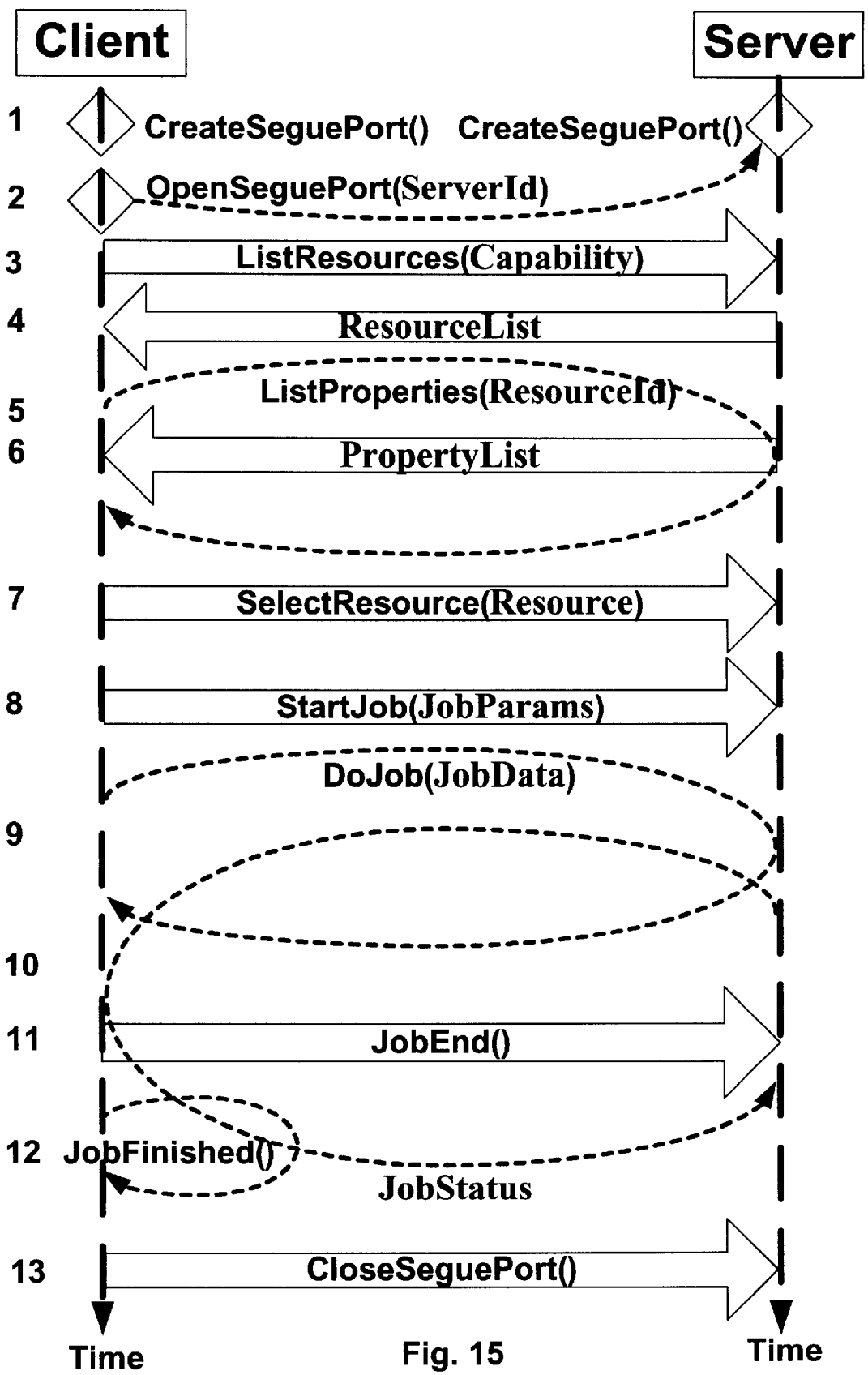
FIG. 15 is a modified UML notation illustrating client-server transactions illustrated in FIGS. 13 and 14.

FIGS. 13 and 14 are flow-charts illustrating the activities (various transactions) on the client side as well as the server side during a typical session wherein the exchanging of frames (either logical or physical) occurs. It this exchange which forms the basis of the transactions. In modified-UML notation, FIG. 15 depicts various transactions within a session which correspond to the activities illustrated in the flow-charts shown in FIGS. 13 and 14. A step-by-step explanation of the dynamic behavior during the transaction follows:

a. Create a Port. The Port is the application's resource to communicate with other entities in the external world which are compliant with the present invention.

b. Open a Port. A Port can be opened as either a server 30 or a client 20. The underlying communication mechanisms may be different depending on the choice of communication protocol.

c. Query server for its resource list (action/request). Before a client 20 starts transacting with the server 30, it would first typically want to know what resources, and their capabilities, are available with the server 30. The server 30 may have only a single resource or multiple resources associated with it for a given capability.

d. Server responds with the resource list (reaction/response).

e. Client iteratively queries (action/reaction) server 30 for properties (parameters) of each resource in the resource list. Each property is a name-value 43, 44 pair. The client 20 would want to display the properties of the currently picked resource to the user so that the user may exercise selection based on the properties.

f. Server 30 responds with the properties of the named resource.

g. Client 20, typically in response to a user action, requests selection of the picked resource. This selection will remain persistent through the life of this session. In effect, this is tantamount to opening a session.

h. Client 20, typically in response to a user action, requests start of a job, specifying the service to be performed through a set of parameters 43, 44.

i. Client 20 iteratively sends job data to the server 30. Server 30, after a job has been started, continually sends job status (event report) to the client 20, whenever a significant progress event occurs.

j. Client 20 sends a job end message (event response) to the server 30 after it has exhausted all its job data.

k. Client 20 monitors completion of the job by server 30 through the job status messages (event report) sent by the server 30.

l. If the server 30 has completed the job, client 20 closes the Port, which effectively, terminates the session as well as the connection.

The present disclosure includes that contained in the present claims as well as that of the foregoing description. Although this invention has been described in its preferred form with a certain degree of particularity, it is understood that the present disclosure of the preferred form has been made only by way of example and numerous changes in the details of construction and combination and arrangement of parts and method steps may be resorted to without departing from the spirit and scope of the invention. Accordingly, the scope of the invention should be determined not by the embodiment[s] illustrated, but by the appended claims and their legal equivalents.

The invention claimed is:

1. A segue component linked to one or more applications in a computer system and connected to a transport medium for transporting data between one or more clients of the computer system interconnected to one or more servers of the computer system, said segue component comprising:
   a. a logical frame element for delivery to said one or more applications and collection of data representative of one or more operations associated with said one or more applications
   b. a physical frame element for delivery between a requesting agent and a target agent, said physical frame element comprising a header element and an argument list element, wherein said header element comprises a marker field for identifying the beginning of said physical frame, a protocol identifier field for identifying a communication protocol of the transport medium between said requesting agent and said target agent, an operation identifier field identifying said one or more operations requested, an argument count field identifying the number of said one or more parameters associated with said request to be packaged into said argument list element, a source identifier field identifying said requesting agent, a destination identifier field for identifying said target agent, a circuit identifier field identifying a circuit associated with a given server, and a sequence number field for identifying the physical frame from which data is being transferred;
   c. means for converting data collected at the requesting agent's logical frame into a literal form language-independent format and packaging said converted data in a byte-oriented format into said requesting agent's physical frame;
   d. means for transporting said converted data to said target agent;
   e. means for extracting said converted data from said requesting agent's physical frame into a target agent's physical frame; and
   f. means for parsing extracted data, for converting said extracted data into executable form, and for delivering said data to said target agent's said logical frame for said target agent's application reaction.

2. The component as claimed in claim 1 wherein each of said one or more operations comprises an identifying code representative of said one or more operations.

3. The component as claimed in claim 1 wherein each of said one or more operations comprises one or more parameters associated with said one or more operations.

4. The component as claimed in claim 3 wherein each of said one or more parameters comprises a name-value pair element, each said name-value pair element further having a name part representative of said one or more operations and a value part representative of said one or more operations.

5. The component as claimed in claim 4 wherein said name part and said value part are byte-oriented.

6. The component as claimed in claim 4 wherein said argument list element is adapted for packaging in literal form one or more arguments representative of said name-value pair elements of said logical frame, said argument list element comprising a unit field for each part of said name-value pair elements; and at least two character fields for each part of said name-value pair elements.

7. The component as claimed in claim 6 wherein said name part of said name-value pair element and said value part of said name-value pair element in said argument list element are represented by a character string.

8. The component as claimed in claim 6 wherein said name part of said name-value pair element in said argument list element is represented by a character string and said value part of said name-value pair element in said argument is represented by a byte string.

9. The component as claimed in claim 1 further comprises means for serializing said requesting agent's physical frame before transporting said requesting agent's physical frame over said transport medium.

10. The component as claimed in claim 1 wherein said marker field is comprised of at least a four-byte field.

11. The component as claimed in claim 1 wherein said protocol identifier field is comprised of at least a four-byte field.

12. The component as claimed in claim 1 wherein said operation identifier field is comprised of at least a two-byte field.

13. The component as claimed in claim 1 wherein said argument field is comprised of at least a two-byte field.

14. The component as claimed in claim 1 wherein said source identifier field is comprised of at least a four-byte field.

15. The component as claimed in claim 1 wherein said destination identifier field is comprised of at least a four-byte field.

16. The component as claimed in claim 1 wherein said circuit identifier field is comprised of at least a four-byte field.

17. The component as claimed in claim 1 where in said sequence number field is comprised of at least a four-byte field.

18. The component as claimed in claim 1 wherein said requesting agent physical frame and said target agent physical frame are structurally identical.

19. A method of transporting data in a platform-independent and protocol-independent manner between one or more clients of a computer system and one or more servers of a computer system, each said system being interconnected by a transport medium, the steps comprising:
   a. delivering a logical frame to an application of a requesting agent on a request for one or more operations for delivery to a target agent for a reaction, said one or more operations having one or more parameters;
   b. providing said one or more parameters to the requesting agent for selection;
   c. collecting data from the requesting agent concerning which parameter of said one or more parameters a user selects;
   d. converting the collected data into a language-independent format;
   e. packaging the language-independent collected data in literal form in a byte-oriented format into a pre-formed physical frame, wherein said physical frame comprises a header element and an argument list element and wherein said header element comprises a marker field for identifying the beginning of said physical frame, a protocol identifier field for identifying a communication protocol of the transport medium between said requesting agent and said target agent, an operation identifier field identifying said one or more operations requested, an argument count field identifying the number of said one or more parameters associated with said request to be packaged into said argument list element, a source identifier field identifying the requesting agent, a destination identifier field for identifying the target agent, a circuit identifier field identifying a circuit associated with a given server, and a sequence number field identifying the physical frame from which data is being transferred;

f. transporting the requesting agent's physical frame over said transport medium to a target agent;

g. extracting said language-independent collected data from said requesting agent's physical frame into an identically formatted target agent physical frame;

h. parsing the extracted language-independent collected data and converting the parsed collected data into executable form for reaction by a target application;

i. delivering the executable form collected data to a logical frame of the target agent for reaction;

j. reacting to the requested action.

20. The method as claimed in claim 19 further comprises repeating the steps of claim 20 wherein the target agent becomes the requesting agent and the requesting agent becomes the target agent.

21. The method as claimed in claim 19 wherein said logical frame comprises an identifying code for identifying said one or more operations and the one or more parameters representative of said one or more operations.

22. The method as claimed in claim 19 wherein said one or parameters are comprised of a name-value pair element having a name part and a value part.

23. The method as claimed in claim 19 wherein said argument list element is adapted for packaging one or more arguments representative of said name-value pair elements of said logical frame in literal form into a unit field for each part of said name-value pair elements, and for packaging one or more arguments representative of said name-value pair elements of said logical frame in literal form into at least two character fields for each part of said name-value pair elements.

24. The method as claimed in claim 23 wherein said name part of said name-value pair element and said value part of said name-value pair element are represented by a character string.

25. The method as claimed in claim 23 wherein said name part of said name-value pair element is represented by a character string and said value part of said name-value pair element is represented by a byte string.

26. The method as claimed in claim 19 further comprising the step of serializing said requesting agent's physical frame before transporting said requesting agent's physical frame over said transport medium.

* * * * *